J. S. WALTON.
PUNCTURE PROOF AUTOMOBILE TIRE.
APPLICATION FILED JAN. 22, 1918.
1,300,063.
Patented Apr. 8, 1919.
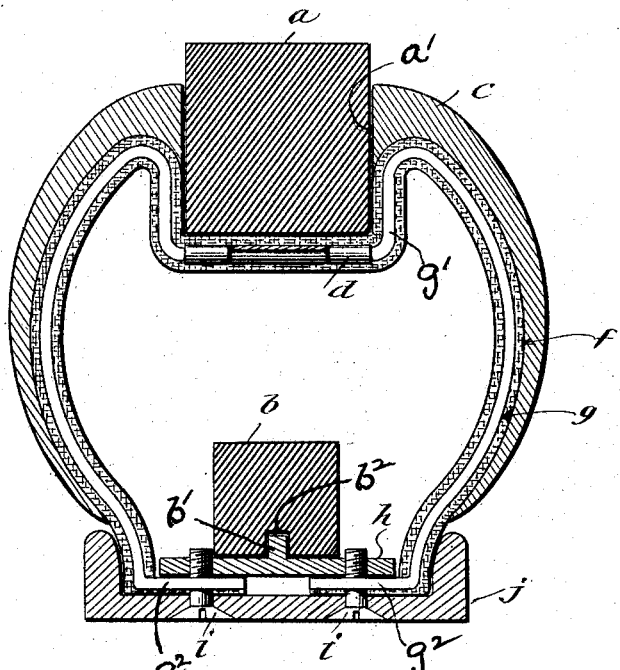
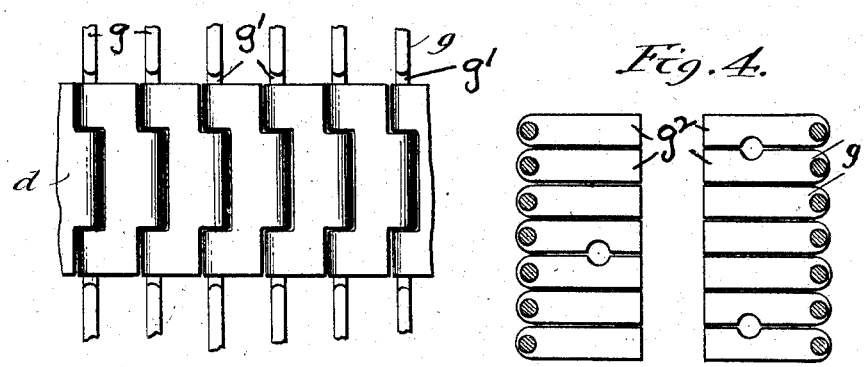
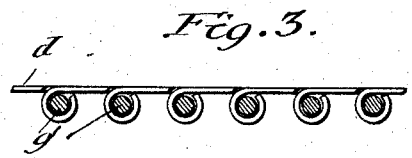
Inventor:
Joseph S. Walton,
Per Leslie G. Bruce,
his attorney.

UNITED STATES PATENT OFFICE.

JOSEPH S. WALTON, OF BURLEY, IDAHO.

PUNCTURE-PROOF AUTOMOBILE-TIRE.

1,300,063.	Specification of Letters Patent.	Patented Apr. 8, 1919.

Application filed January 22, 1918. Serial No. 213,266.

*To all whom it may concern:*

Be it known that I, JOSEPH SAVANNAH WALTON, a citizen of the United States, residing at Burley, in the county of Cassia and State of Idaho, have invented certain new and useful Improvements in Puncture-Proof Automobile-Tires, of which the following is a specification.

My invention relates to improvements in resilient tires for motor vehicle wheels and is particularly directed to providing a combined rubber and spring metal tire, which will possess all of the advantages of a pneumatic tire without the disadvantages thereof.

One of the objects of my invention is to provide a tire of the above type, which includes a detachable tread member that may be renewed or replaced without discarding the whole tire. In my improved tire this detachable tread is formed of tough hard rubber, which will withstand hard usage with very little wear.

Another object of my invention is to provide a resilient tire, which will be held in distended condition by a series of springs that are flexibly connected together by a flexible chain.

Still another object of the invention is to provide a resilient tire composed of a rubber casing supported by springs and having in its interior, a resilient buffer to limit the inward movement of the tire tread.

A further object is to provide a tire which is of simple construction and inexpensive to manufacture.

With the foregoing objects outlined and with other objects in view, which will appear as the description proceeds, my invention consists in the novel features hereinafter described in detail, illustrated in the accompanying drawing and more particularly pointed out in the appended claims.

Referring to the drawing:—

Figure 1 is a transverse vertical sectional view of my improved tire.

Fig. 2 is a top plan view of a portion of the flexible chain and showing the manner of connecting the same to the springs.

Fig. 3 is a vertical sectional view of the parts shown in Fig. 2.

Fig. 4 is a plan view of the feet of a few of the springs.

In the drawing $j$ designates a rim, which as shown, is channel-shaped in cross section, and which it will be understood is circular in side view.

The tire consists of a series of inverted U-shaped springs $g$ bent to form channel-shaped members $g'$ and provided at their ends with feet $g^2$. These springs are preferably formed of steel wire, which, as shown in Fig. 4, are of round cross-section and the feet are flattened out. The springs are connected to the rim by means of screws $i$, which pass between the feet and engage a plate $h$ that is located on the interior of the tire. A flexible chain $d$ connects the channel-shaped portion of the springs and this connection is made by curling the edges of the chain links around the springs, as shown in Figs. 2 and 3. This chain permits the outer portions of the springs to move relatively to each other so that the tire may be distorted without permanently affecting the position of the springs.

The springs and chain are embedded in vulcanized fiber $f$, which combines the parts in a unitary form, and an outer casing $c$ of hard rubber is secured to the fiber $f$ in order to give a neat appearance to the tire and to protect the fiber.

The periphery of the tire is provided with a circumferential groove $a'$ in which is detachably mounted a hard rubber tread $a$, which extends beyond the casing $c$ and forms the ground engaging portion of the tire.

In order to limit the inward movement of the tire, I have arranged a hard rubber buffer $b$ in the interior of the tire and this buffer is prevented from lateral displacement by a projection $b'$ extending from the plate $h$ and entering a groove $b^2$ in the buffer.

In operation, the parts constructed and connected as described, permit the tire to take up the shocks caused in traveling over rough surfaces and the springs tend to maintain the tire in distended condition.

It will be understood, that various changes and modifications may be made in the construction shown without departing from the basic principles or sacrificing any of the advantages of the invention, as defined in the following claims.

What I claim and desire to secure by Letters Patent is:—

1. A resilient tire comprising a flexible casing inclosing wire springs having channel-shaped portions, a circumferential groove provided in the casing adjacent the channel-shaped portions of the springs, and a removable tread located in said groove.

2. A resilient tire comprising a series of U-shaped wire springs having channel-shaped portions, a casing inclosing said springs and having a circumferential groove adjacent the channel-shaped portions of the springs, and a tread removably mounted in said groove.

J. S. WALTON.